United States Patent
Hirschfeld et al.

(10) Patent No.: US 6,700,219 B2
(45) Date of Patent: Mar. 2, 2004

(54) STEERING COLUMN MODULE

(75) Inventors: Klaus Hirschfeld, Ludenscheid (DE); Holger Lettmann, Plettenberg (DE); Markus Adam, Olpe (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/251,381

(22) Filed: Sep. 20, 2002

(65) Prior Publication Data

US 2003/0045133 A1 Mar. 6, 2003

Related U.S. Application Data

(63) Continuation of application No. PCT/EP02/01384, filed on Feb. 9, 2002.

(51) Int. Cl.$^7$ ................................................. B60L 1/00
(52) U.S. Cl. ........................... 307/10.1; 439/15; 439/34
(58) Field of Search .................. 307/9.1, 10.1; 200/61.54; 439/15, 34, 164

(56) References Cited

U.S. PATENT DOCUMENTS

| | | | |
|---|---|---|---|
| 5,431,573 A | 7/1995 | Endo et al. | |
| 5,747,763 A | 5/1998 | Uchiyama et al. | |
| 5,944,534 A | 8/1999 | Hoffmann et al. | |
| 6,151,980 A | * 11/2000 | Nishitani et al. | ......... 74/484 R |
| 6,403,900 B2 | * 6/2002 | Hecht et al. | ............. 200/61.54 |
| 6,583,373 B2 | * 6/2003 | Ketzer et al. | ............ 200/61.54 |

* cited by examiner

Primary Examiner—Brian Sircus
Assistant Examiner—Sharon A. Polk
(74) Attorney, Agent, or Firm—Brooks Kushman P.C.

(57) ABSTRACT

A steering column module for a motor vehicle includes functional units such as steering angle sensors and torque sensors adjacently arranged on a steering column. The functional units deliver respective output signals and requiring respective control signals. An electronics unit is connected with an onboard power supply of a motor vehicle for receiving power. The electronics unit is operable for processing the output signals of the functional units and operable for generating control signals for the functional units. A first one of the functional units is connected to the electronics unit via electrical plug-in connector parts with correspondingly arranged counter electrical plug-in connector parts situated on the electronics unit. A second one of the functional units is combined with the electronics unit to form an inseparable assembly.

17 Claims, 2 Drawing Sheets

STEERING COLUMN MODULE

CROSS-REFERENCE TO RELATED APPLICATIONS

This is a continuation of International Application PCT/EP02/01384, published in German, with an international filing date of Feb. 9, 2002.

BACKGROUND OF THE INVENTION

1. Field of the Invention

The invention relates to a steering column module having modular functional units and an associated electrical unit.

2. Background Art

Such steering columns are provided in motor vehicles for the purpose of initiating and executing various functions, e.g., direction indication and wiper-washer operations, signal transmission, and steering angle acquisition.

In a conventional structure, the various functional units are designed as separate electronic or electromechanical modules which are arranged in different axial planes along the steering axis. The modules may also concentrically wrap around the steering column.

The functional units can encompass, for example, a coil spring cassette for power supply and signal transmission in the steering wheel, a steering angle sensor for acquiring the steering angle, and different steering column switching components. Such functional units are allocated to the varying operating functions, e.g., direction indication, windshield washing function, etc.

An electronics unit is allocated to the different functional units. The electronics unit contains a printed circuit board which carries the power, the evaluation, and, if necessary, the control electronics of the functional units, and connects the different functional units with the onboard power supply system. Detachable plug-in connectors are provided for contacting the different functional units with the electronics unit.

In a previously known configuration, e.g., as known from EP 0 853 022 A1, the electronics unit forms its own plane in the structure of the steering column module, and is hence integrated into the layered structure of the steering column module. In this previously known configuration, the electronics unit forms a lowermost plane on which several steering column assembly switches forming a functional unit are arranged in a first overlying plane. The side-by-side arrangement makes it easy to establish direct contact between the switches and electronics.

A functional unit such as a coil spring cassette is situated in another plane above the plane of the steering column assembly switch. In order for it to also be connected with the electronics unit, it has a longitudinal projection extending through the arrangement of steering column assembly switches and into the plane of the electronics unit such that it can be introduced into a plug-in connector part located therein.

While several functional units can be arranged in this previously known steering column module and electrically contacted in various planes, the functional units not directly adjacent to the electronics module must be extended through the other ones.

Therefore, this layered layout of functional units results in printed conductors of varying length to the different modules. In particular, in steering column modules containing many functional layers, the functional unit located the farthest away from the electronics unit is connected to the electronics unit by comparatively long contact tabs. In functional units where signals that are very low relative to their voltage or current level transmitted, e.g., in the case of a steering angle sensor, electromagnetic interference can trigger disturbances in the printed conductors and thereby impair the functional reliability of the unit.

The operational reliability of the functional units contacted by plug-in connectors can also be negatively impacted, in particular after many years of operation and under unfavorable environmental conditions, e.g., a high level of atmospheric humidity in the environment, for example by an oxidation of the contacts. This makes it necessary to use especially high quality, e.g., gold-plated and/or specially encapsulated plug-in contacts, but these are very cost-intensive.

SUMMARY OF THE INVENTION

Therefore, an object of the present invention is to provide a steering column module that avoids long connection paths for susceptible electronic functional units, exhibits a high operational reliability and a compact modular structure, and is cost-effective in realization.

This object is achieved according to the present invention by the features specified in the characterizing clause of the main claim.

In such a structure, it is especially advantageous to combine the advantages of a modular structure for the steering column module, relative to the flexibility and ease of maintenance of the individual components, with the advantages from integrating sensitive functional units into assemblies.

In the steering column module according to the present invention, a sensitive functional unit is integrated with the electronics unit in a shared casing into an inseparable, compact assembly. Preferably, a permanent electrical connection exists between the electronics and functional units.

The permanent connection can be established using directly soldered cables, but the electronic components of the functional unit and the components of the electronics unit cooperating therewith are preferably situated on a shared, non-conductive substrate provided with electrical printed conductors. The substrate can be a printed circuit board or a flexible film.

Preferably, the functional unit integrated into the assembly is a steering angle sensor, wherein the latter is situated transverse to the steering axis and at least partially wraps around it, and wherein the integrated electronics unit is preferably situated parallel to the steering axis. This type of arrangement results in an essentially angled, L-shaped structure. The substrate carrying the printed conductors is here also angled.

If the substrate is designed as a printed circuit board, the angled configuration of the printed circuit board can be achieved by diminishing the printed circuit board on the side facing away from the printed conductors to a thickness of typically several tenths of a millimeter. This can be done through mechanical sinking so that the printed circuit board can be flipped over without breaking the board material.

In an alternative embodiment, the substrate is designed as a flexible film which can be angled without any problem. The printed conductor film is here preferably abutted against a supporting structure inside the casing which is secured in the two arms of the L-shaped structure.

In another embodiment, plug-in connector parts pointing in the radial or tangential direction are secured on the arms of the L-shaped angled structure that accommodate the electronics unit, on the side facing the steering axis relative to the plugging direction, so that additional functional units can be hooked up to these arms over a short path via the corresponding plug-in connector parts. Additional functional units, e.g., ones that are less sensitive, can also be hooked up via longer line paths with an axial plug-in direction, if necessary.

In another embodiment of the steering column module, a second sensitive functional unit is combined with the electronics unit and the first functional unit to form an inseparable, essentially U-shaped assembly. The middle part of the U-shaped assembly is situated parallel to the steering axis and has plug-in connector parts extending in a radial and tangential direction. The second functional unit can be a torque sensor, for example. In this configuration as well, the electronics unit is directly and undetachably connected with the first and second functional unit via lines such as conductors, wherein the lines are preferably placed on a shared substrate that is angled in the shape of a U and extends into all parts of the U-shaped casing. The arms of the assembly allocated to the integrated functional units can here at least partially wrap around the steering column.

BRIEF DESCRIPTION OF THE DRAWINGS

The invention will be explained in greater detail below with reference to the following figures.

DETAILED DESCRIPTION OF THE PREFERRED EMBODIMENT(S)

Figure 1A:
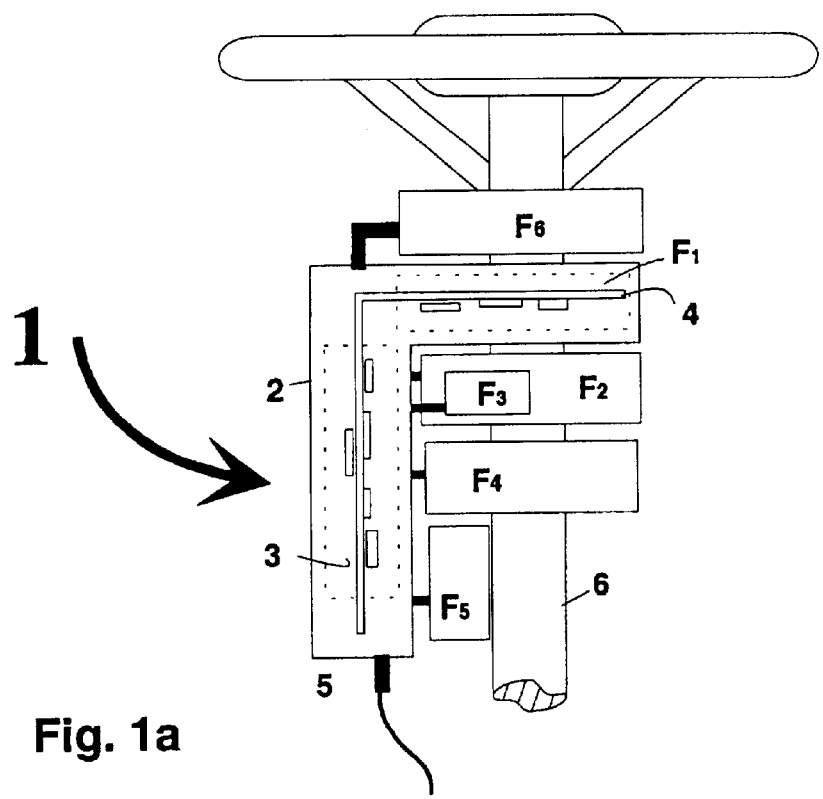
FIG. 1a illustrates a diagrammatic view of an embodiment of the steering column module in accordance with the present invention.

FIG. 1a illustrates a diagrammatic view of a configuration of a steering column module 1 in accordance with the present invention. Steering column module 1 modularly includes several separate functional units $F_2 \ldots F_6$. A functional unit $F_1$ and an electronics unit 3 are integrated in an inseparable assembly 2. The accompanying electronic components are here situated on a shared, one-piece substrate 4. Substrate 4 is preferably designed as a printed circuit board. Inseparable assembly 2 is hooked up to an onboard power supply system by means of a plug-in connector part 5.

Functional units $F_1 \ldots F_6$ are grouped around steering column 6 and can also wrap around the latter. For example, if functional unit $F_1$ is a steering angle sensor then it makes sense for assembly 2 to concentrically envelop the steering column completely with its arm containing functional unit $F_1$. Functional units $F_2 \ldots F_5$ are contacted using plug-in connector parts, which exhibit a radial or tangential plugging direction. To this end, plug-in connector parts that cooperate with corresponding counter-plug-in connector parts secured to the separate functional units are attached to the arm of inseparable assembly 2 extending parallel to the steering column and pointing in a radial or tangential direction (not shown in the figures for reasons of clarity). Module $F_6$ wrapping around the steering column is contacted at the top end of the steering column module by a connector part with an axial plugging direction in this embodiment. As a result, the outside module, preferably a coil spring cassette, can be slipped off in an axial direction, e.g., for maintenance or repair purposes.

Figure 1B:
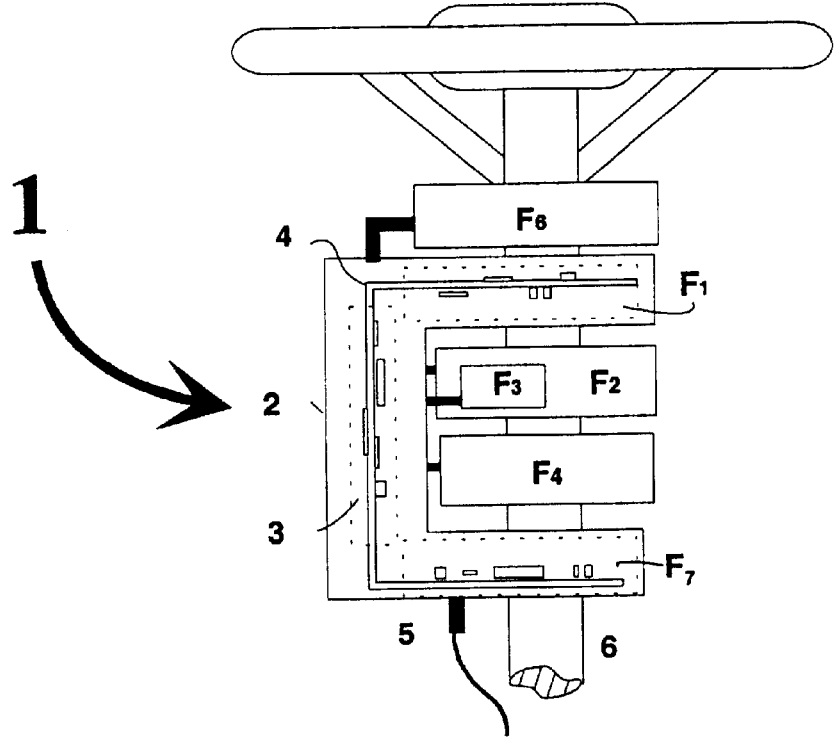
FIG. 1b illustrates a diagrammatic view of another embodiment of the steering column module in accordance with the present invention.

FIG. 1b illustrates another embodiment of the steering column module. In this embodiment, electronics unit 3 and two additional functional units $F_1$ and $F_7$ are integrated into an inseparable assembly 2.

The second susceptible functional unit $F_7$ can be a torque sensor, for example. The electronic components of functional units $F_1$ and $F_7$ and electronics unit 3 are arranged on a shared substrate 4 extending in the shape of a U in the shared casing. The structural elements can be situated on the top and bottom side of substrate 4.

The one-piece design of substrate 4 enables the shortest line paths from electronics unit 3 to functional units $F_1$ and $F_7$, wherein the undetachable electrical connection ensures a high level of functional reliability for the two functional units. This eliminates the need to use special, high quality, e.g., gold-plated, but also cost-intensive, plug-in connector parts.

Situated on the middle part of inseparable assembly 2 and extending parallel to steering column 6 are plug-in connector elements pointing in a radial or tangential direction, which cooperate with corresponding counter plug-in connector parts secured to the separate functional units. Accommodating the electromagnetically sensitive functional units along with the electronics unit in a shared casing makes it possible to use the means for electrical shielding incorporated therein, e.g., screening sheets, or moisture protection (e.g., sealing measures) jointly for the electronics and functional units; long, susceptible line paths are avoided.

Figure 2:
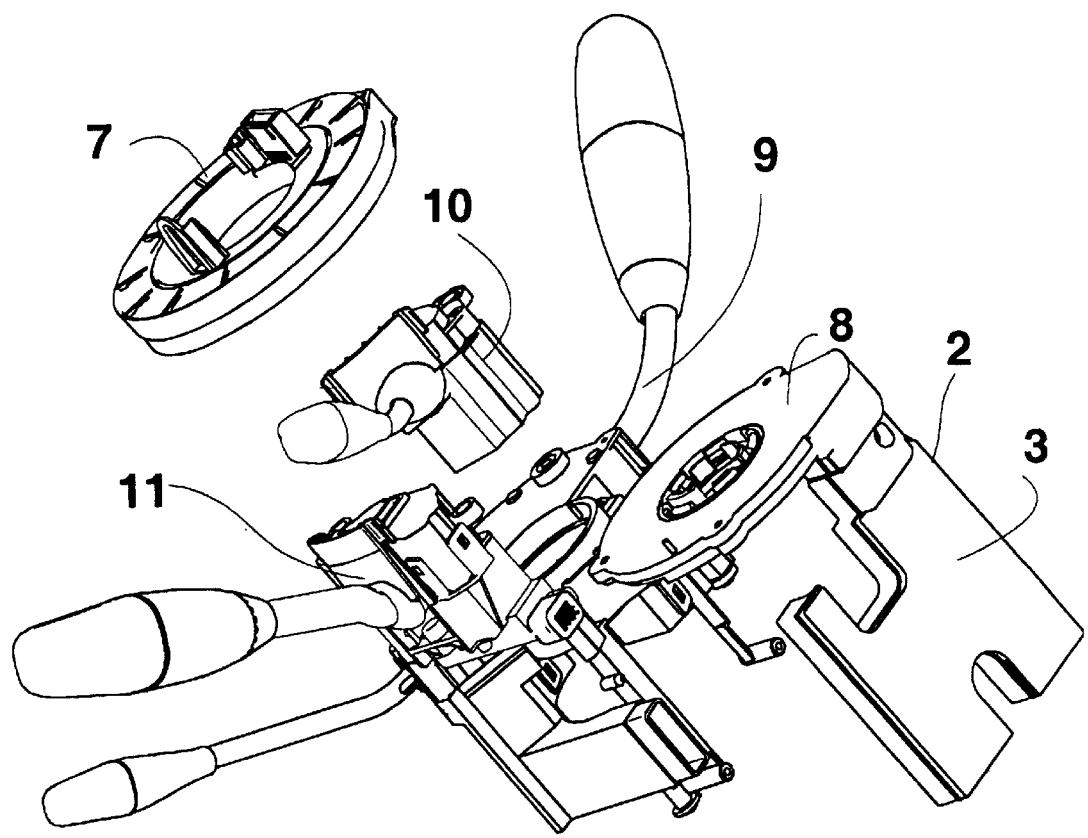
FIG. 2 illustrates an exploded view of an example of the steering column module in accordance with the present invention.

FIG. 2 illustrates an exploded view of another design variant of the steering column module. The steering column module shown in FIG. 2 includes a coil spring cassette 7, a first steering column assembly nit 9, on which two control stalks are mounted, as well as two other steering column assembly units 10 and 11. The steering column module also includes an inseparable assembly 2 which contains a steering angle sensor 8 and the electronics unit 3.

Inseparable assembly 2 is essentially L-shaped in design, and concentrically wraps around the steering column with its arm containing steering angle sensor 8. The electronic components of steering angle sensor 8 and electronics unit 3 are assembled on a one-piece substrate, which is also angled.

Steering angle sensor 8 preferably contains a code disk provided with a digital bar-code and irradiated by a lighting element, and a CCD camera line for optically acquiring the bar-code. Steering angle sensor 8 also preferably contains means for acquiring the number of turns executed by the steering wheel, such as a spiral analog track additionally incorporated on the code disk, so that the adjustment range of the steering wheel can be acquired over a range of angles spanning 360°, e.g., over a range of angles proceeding from zero to about ±720°.

The arm encompassing electronics unit 3 is situated parallel to the steering axis. Radially and tangentially pointing plug-in connector parts are secured on the side of the arm facing the steering column, and contact electronics unit 3 with steering column assembly units 9, 10, and 11 via counter plug-in connectors present on the latter.

The description herein describes the advantages associated with the steering column module in accordance with the present invention. Such advantages, in particular, being relative to a high level of operational reliability, without having to lose the advantages of a compact, modular structure in the process.

Integrating the electronics unit and a sensitive functional unit into a shared compact casing avoids long line or conductor paths, which helps to increase operational reliability. Electrical shielding measures and sealing precautions against other outside influences like moisture, dust, etc., can be used jointly for the units integrated into the compact assembly. The uninterrupted, undetachable electrical connection of the electronics and functional unit prevents undesired contact resistances permanently, thereby bringing about a largely trouble-free operation of the functional unit. Suitably attached plug-in connectors make it possible to modularly secure additional functional units to the inseparable assembly. Further, the inseparable assembly can be provided based on the desired number and design of the separate functional modules. In this case, it can be provided that the casing of the assembly be uniformly designed, while its interior—the electronics and plug-in connector parts—is adapted to the respectively desired conditions.

What is claimed is:

1. A steering column module for a motor vehicle, the module comprising:
    a plurality of functional units arranged on a steering column, the functional units delivering respective output signals and requiring respective control signals; and
    an electronics unit connected with an onboard power supply of a motor vehicle for receiving power, the electronics unit operable for processing the output signals of the functional units and operable for generating control signals for the functional units;
    wherein a first one of the functional units is connected to the electronics unit via connector parts with correspondingly arranged counter connector parts situated on the electronics unit;
    wherein a second one of the functional units is combined with the electronics unit to form an inseparable assembly of the electronics unit and the second one of the functional units.

2. The module of claim 1 wherein:
    the second functional unit is arranged uninterruptedly and undetachably to components of the electronics unit and cooperates therewith by electrical conductive links.

3. The module of claim 1 wherein:
    electrical components of the second functional unit are allocated to components of the electronics unit and cooperate therewith by electrical printed conductors of a substrate.

4. The module of claim 3 wherein:
    the inseparable assembly is L-shaped, wherein the electronics unit is allocated to one arm of the inseparable assembly, and the second functional unit is allocated to the other arm of the inseparable assembly.

5. The module of claim 4 wherein:
    the substrate extends both into the one arm and into the other arm of the inseparable assembly.

6. The module of claim 3 wherein:
    the substrate is a one-piece, angled printed circuit board extending into the sections of the inseparable assembly situated parallel and transverse to the steering column.

7. The module of claim 3 wherein:
    the substrate is a flexible printed conductor film extending into the sections of the inseparable assembly situated parallel and transverse to the steering column.

8. The module of claim 7 wherein:
    the printed conductor film is secured on a supporting structure present within the inseparable assembly.

9. The module of claim 4 wherein:
    the one arm of the inseparable assembly accommodating the electronics unit extends parallel to a longitudinal axis of the steering column, and the other arm of the inseparable assembly accommodating the second functional unit is aligned transverse to the longitudinal axis of the steering column.

10. The module of claim 9 wherein:
    the one arm of the inseparable assembly extending parallel to the longitudinal axis of the steering column has counter electrical plug-in connector parts that extend radially relative to the longitudinal axis of the steering column.

11. The module of claim 4 wherein:
    the other arm of the inseparable assembly having the components of the second functional unit concentrically wraps around a portion of the steering column.

12. The module of claim 1 wherein:
    a third one of the functional units is combined with the electronics unit to form the inseparable assembly, wherein the inseparable assembly is U-shaped and includes a middle portion and two arms, wherein the middle portion extends parallel to the longitudinal axis of the steering column and accommodates components of the electronics unit, and the two arms respectively accommodate components of the second and third functional units.

13. The module of claim 12 wherein:
    electrical components of the second and third functional units are allocated to components of the electronics unit and cooperate therewith by electrical printed conductors present on a substrate, wherein the substrate is U-shaped and extends into both arms and the middle portion of the inseparable assembly.

14. The module of claim 12 wherein:
    the middle portion of the inseparable assembly includes counter electrical plug-in connector parts that extend radially relative to the longitudinal axis of the steering column.

15. The module of claim 12 wherein:
    both arms of the inseparable assembly concentrically wrap around a portion of the steering column.

16. The module of claim 1 wherein:
    the second functional unit is a steering angle sensor operable for generating an output signal indicative of rotational motion of a steering wheel.

17. A steering column module for a motor vehicle, the module comprising:
    a plurality of functional units adjacently arranged on a steering column, the functional units delivering respective output signals and requiring respective control signals; and
    an electronics unit connected with an onboard power supply of a motor vehicle for receiving power, the electronics unit operable for processing the output signals of the functional units and operable for generating control signals for the functional units;
    wherein a first one of the functional units is connected to the electronics unit via electrical plug-in connector parts with correspondingly arranged counter electrical plug-in connector parts situated on the electronics unit;
    wherein a second one of the functional units is integrated with the electronics unit in a shared casing into an inseparable assembly.

* * * * *

UNITED STATES PATENT AND TRADEMARK OFFICE
CERTIFICATE OF CORRECTION

PATENT NO. : 6,700,219 B2
DATED : March 2, 2004
INVENTOR(S) : Klaus Hirschfeld et al.

It is certified that error appears in the above-identified patent and that said Letters Patent is hereby corrected as shown below:

<u>Title page,</u>
Insert item:
-- [30] Foreign Application Priority Data
Feb. 16, 2001 (DE)………………… 101 08 377.7 --.

Signed and Sealed this

Twenty-fifth Day of May, 2004

JON W. DUDAS
*Acting Director of the United States Patent and Trademark Office*